US011293506B2

(12) United States Patent
Gunasekaran et al.

(10) Patent No.: US 11,293,506 B2
(45) Date of Patent: Apr. 5, 2022

(54) AUTOMATIC SLACK ADJUSTER

(71) Applicant: MADRAS ENGINEERING INDUSTRIES PRIVATE LIMITED, Chennai (IN)

(72) Inventors: Vivekanandan Gunasekaran, Chengalpattu (IN); Sriram Sivaram, Chennai (IN)

(73) Assignee: MADRAS ENGINEERING INDUSTRIES PRIVATE LIMITED, Chennai (IN)

( * ) Notice: Subject to any disclaimer, the term of this patent is extended or adjusted under 35 U.S.C. 154(b) by 0 days.

(21) Appl. No.: 16/323,446

(22) PCT Filed: Apr. 18, 2018

(86) PCT No.: PCT/IN2018/050232
§ 371 (c)(1),
(2) Date: Feb. 5, 2019

(87) PCT Pub. No.: WO2018/220639
PCT Pub. Date: Dec. 6, 2018

(65) Prior Publication Data
US 2020/0088255 A1    Mar. 19, 2020

(30) Foreign Application Priority Data
May 31, 2017   (IN) ............................... 20174109126

(51) Int. Cl.
F16D 65/60    (2006.01)
F16D 125/30   (2012.01)
F16D 125/52   (2012.01)

(52) U.S. Cl.
CPC .......... *F16D 65/60* (2013.01); *F16D 2125/30* (2013.01); *F16D 2125/52* (2013.01); *F16D 2250/0084* (2013.01)

(58) Field of Classification Search
CPC .. F16D 2125/30; F16D 65/60; F16D 2125/28; F16D 2125/52; F16D 2250/0084
See application file for complete search history.

(56) References Cited

U.S. PATENT DOCUMENTS 2,156,154 A * 4/1939 Hooker ................... F16D 65/50
                                                    74/522
3,351,163 A * 11/1967 Sander .................... F16D 65/60
                                                    188/196 BA (Continued)

*Primary Examiner* — Robert A. Siconolfi
*Assistant Examiner* — Mahbubur Rashid
(74) *Attorney, Agent, or Firm* — Seyfarth Shaw LLP; Brian Michaelis

(57) ABSTRACT

The invention is for automatic slack adjuster for an automobile with a housing having an aperture for receiving a brake cam shaft comprising of a worm gear coaxially mounted within the said housing aperture and configured to coaxially engage the brake cam shaft, such that the said worm gear and said cam shaft rotating together about a first axis. The arrangement has a bore with a single open end for receiving a worm clutch shaft. The said worm clutch shaft is mounted in the said housing to rotate about a second axis, which is perpendicular to first axis. The invention has only one side opening. The thrust load from the worm shaft is transferred through the thrust bush through the main housing of the assembly.

2 Claims, 23 Drawing Sheets

(56) References Cited

U.S. PATENT DOCUMENTS

| | | | | |
|---|---|---|---|---|
| 3,921,765 A * | 11/1975 | Swander, Jr. | F16D 65/60 | 188/79.55 |
| 3,997,036 A * | 12/1976 | Zeidler | F16D 65/60 | 188/79.55 |
| 4,019,612 A * | 4/1977 | Mathews | F16D 65/60 | 188/196 BA |
| 4,057,128 A * | 11/1977 | Coupland | F16D 65/60 | 188/79.54 |
| 4,094,390 A * | 6/1978 | Neuman | F16D 65/60 | 188/196 D |
| 4,121,703 A * | 10/1978 | Moss | F16D 65/60 | 188/196 BA |
| 4,256,208 A * | 3/1981 | Najer | F16D 65/60 | 188/196 D |
| 4,380,276 A * | 4/1983 | Sweet | F16D 65/60 | 188/196 BA |
| 4,384,638 A * | 5/1983 | Crissy | F16D 65/60 | 188/196 BA |
| 4,440,268 A * | 4/1984 | Karlsson | F16D 65/60 | 188/79.55 |
| 4,484,665 A * | 11/1984 | Svensson | F16D 65/60 | 188/196 BA |
| 4,624,345 A * | 11/1986 | Berg | F16D 65/50 | 188/196 M |
| 4,727,963 A * | 3/1988 | Villata | F16D 55/2245 | 188/196 D |
| 4,825,979 A * | 5/1989 | Svensson | F16D 65/60 | 188/196 D |
| 4,875,557 A * | 10/1989 | Hagin | F16D 65/60 | 188/79.55 |
| 5,350,043 A * | 9/1994 | Crewson | F16D 65/60 | 188/196 BA |
| 6,450,302 B1 * | 9/2002 | Lyons | F16D 65/58 | 188/196 BA |
| 7,040,465 B2 * | 5/2006 | Jones | F16D 51/00 | 188/196 V |
| 7,198,138 B2 * | 4/2007 | Chadha | F16D 65/60 | 188/79.55 |
| 7,708,122 B2 * | 5/2010 | Plantan | F16D 65/60 | 188/79.55 |
| 8,302,742 B2 * | 11/2012 | Louis | B60T 7/108 | 188/79.55 |
| 8,672,101 B2 * | 3/2014 | Louis | F16D 65/50 | 188/79.55 |
| 8,820,490 B2 * | 9/2014 | Hayford | F16D 65/50 | 188/196 C |
| 9,360,070 B2 * | 6/2016 | Gripemark | F16D 65/60 | |
| 2007/0045065 A1 * | 3/2007 | Plantan | F16D 65/60 | 188/196 BA |
| 2007/0209889 A1 * | 9/2007 | Echambadi | F16D 65/60 | 188/196 D |
| 2010/0122879 A1 * | 5/2010 | Louis | B60T 11/06 | 188/79.55 |
| 2011/0073422 A1 | 3/2011 | Li | | |
| 2013/0240308 A1 | 9/2013 | Kay et al. | | |
| 2016/0333952 A1 * | 11/2016 | Keller | F16D 65/68 | |

* cited by examiner

AUTOMATIC SLACK ADJUSTER

FIELD OF INVENTION

This invention relates to an automatic slack adjuster and an improved automatic slack adjuster

PRIOR ART

S-ASA Function—General:

Self-setting Automatic Slack Adjuster (S-ASA) design works on 'clearance sensing' principle. Meaning, as the brake lining wears out due to application of brake, S-ASA adjusts the clearance between the brake lining & the drum and maintains it to the pre-determined value. This automatic adjustment helps to maintain the brake effective all the time. (Refer FIG. 1)

Conventionally, the Automatic slack adjuster design and construction remains same for Light duty vehicle (Typically 9 Ton GVW) to Medium (Typically 16 Ton GVW), Heavy duty vehicle (Typically 25 Ton and above). Only the spline (indicated in FIG. 2) size of the worm wheel is changed to suit the mating cam shaft. For Light duty vehicle, the conventional existing Auto slack adjuster is 'over designed' and bulky.

Object of the Invention

1. The object of the invention is a design which is compact and tailor-made to meet the brake cam shaft torque requirement of the Light duty vehicles.
2. A design which is improved for better endurance life—the sealing requirements were reduced in this design (eliminated one side port opening in the housing).
3. An Assembly process which is simpler. All components are assembled in only two axial directions whereas in conventional design, it happens in three directions.
4. A Lighter means compared to the existing ones in use. That means each brake or wheel end is made lighter by at least 1 kg which is a significant improvement for power-weight ratio.

DESCRIPTION OF THE INVENTION

Construction of the slack adjuster as per the invention is illustrated in FIG. 2

Order of Assembly of the components is disclosed in FIG. 2B

Front Side

Tail Bush is assembled.

Worm Gear, along with 2 Sealing Rings on either side, is placed.

Left Side

Heavy coil spring placed in position. Then spring seat and then Thrust bush.

Worm Shaft along with Clutch Worm Gear and Sealing Ring are assembled together on one side of the body. Finally Bearing Retainer is assembled. Kindly note, the bearing retainer threads are coated with 'locking compound' and hence no need for Rivet locking.

Again from Front Side

Now again on front side of the body, Pinion & Ratchet Assembly is placed. Then Gasket along with Cover Plate Assembly is mounted to head portion of the body using 6 Counter Sunk Screws.

FIG. 3 illustrates that one side remain closed (no component assembly)

No components assembly from Right side in this LT S-ASA and hence we avoid one side opening and potential leak path. In normal existing S-ASA, there is an opening on Right side and components are assembled from that end also.

Though one side opening in the housing is eliminated, still the functional requirement has been met in the LT S-ASA by addition of a component called 'Thrust Bush' as shown in the below image. (FIG. 4)

The thrust load from the worm shaft (5) is transferred through the 'Thrust Bush (9)' to the main housing (1).

Working Principle of the Invention

Working Principle of SASA (LT)

FIG. 5 is Illustration of foundation on brake and showing the movement of slack adjuster during braking with excess clearance B Description with Respect to FIG. 5:

A. The normal preset running clearance A for which no adjustment should be made;
B. The excess clearance B, when lining and drum wear and for which adjustment should be made
C. The elasticity of the breaking system C which is caused by variable brake load, rum expansion and component flexibility, for which no adjustment should be made FIG. 6 is illustration of starting position of SASA Description with Respect to FIG. 6 and FIG. 7:

The control arm (20) of the S-ASA is fixed to the anchor bracket in a position where suitable location is available on the vehicle for fastening the control arm fixing position (20'). During the initial brake setting, the control worm screw (13.5) is getting positioned with a gap between pawl housing (13.2) and control worm screw (13.5) by the torsion spring (13.9) load. This is to determine the pre-set clearance that will be maintained between brake lining and the brake drum.

Figure 1:
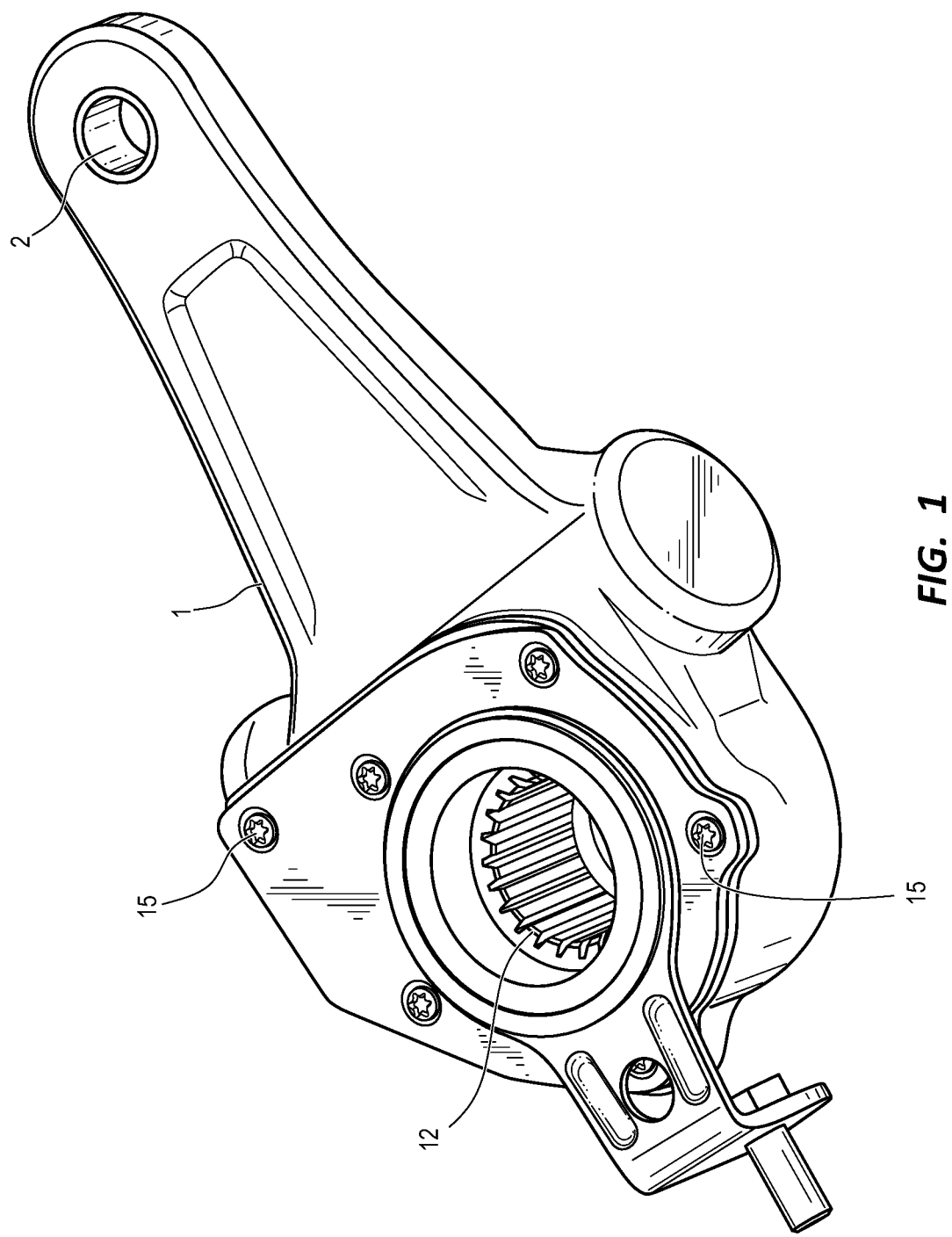
Figure 2A:
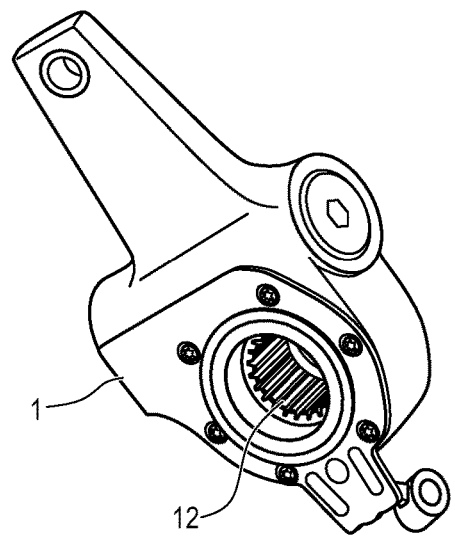
Figure 2B:
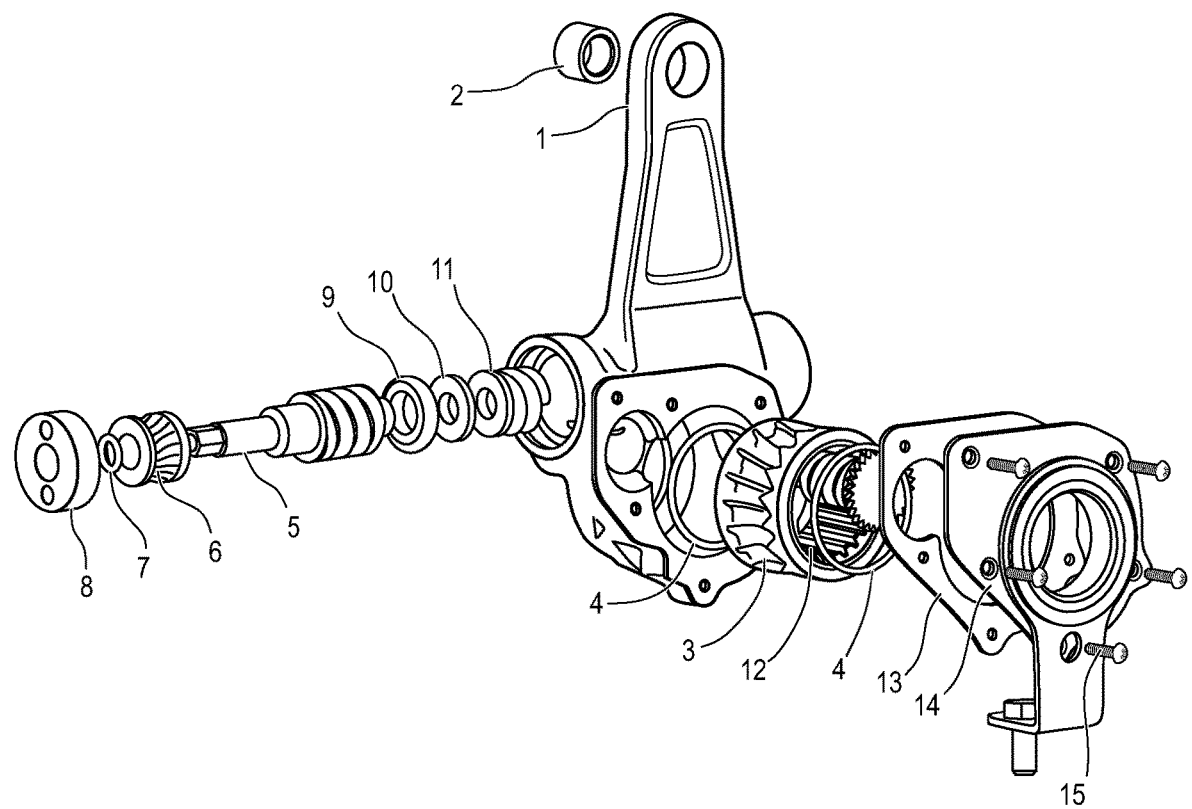
Figure 3:
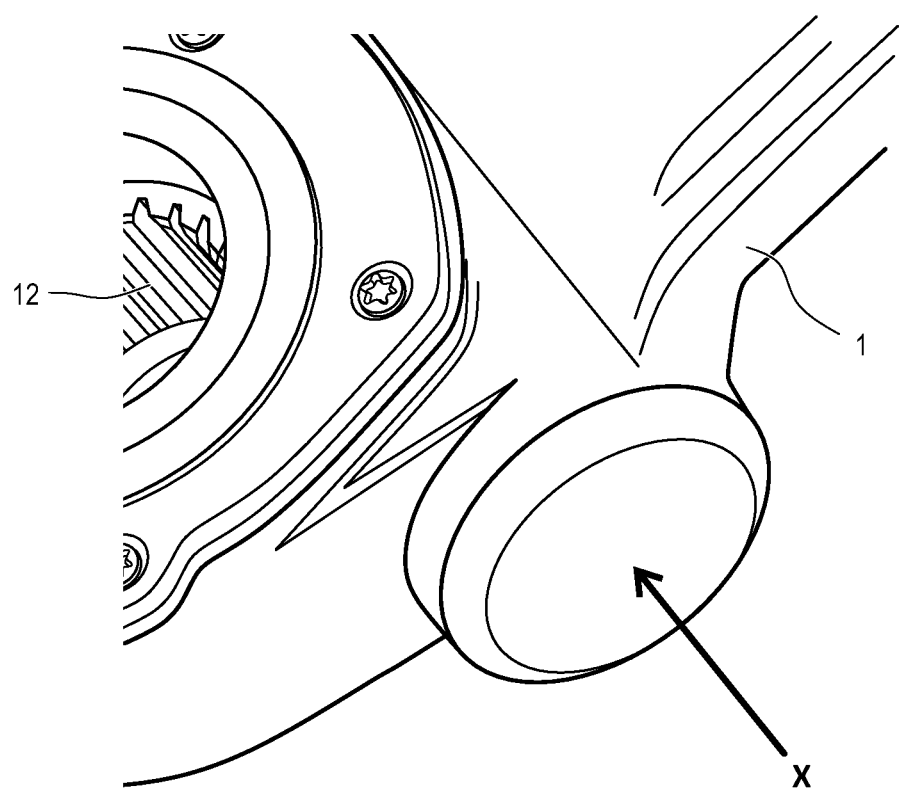
Figure 4:
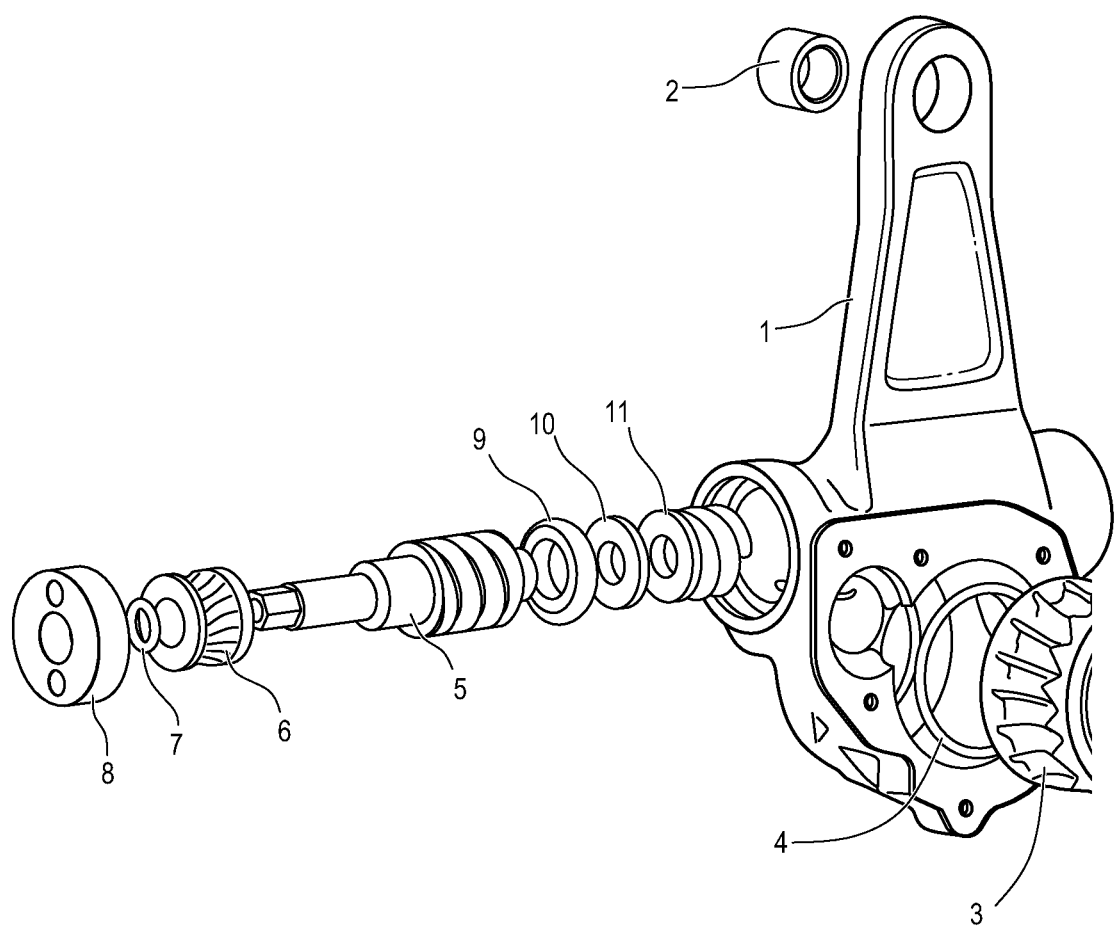
Figure 5:
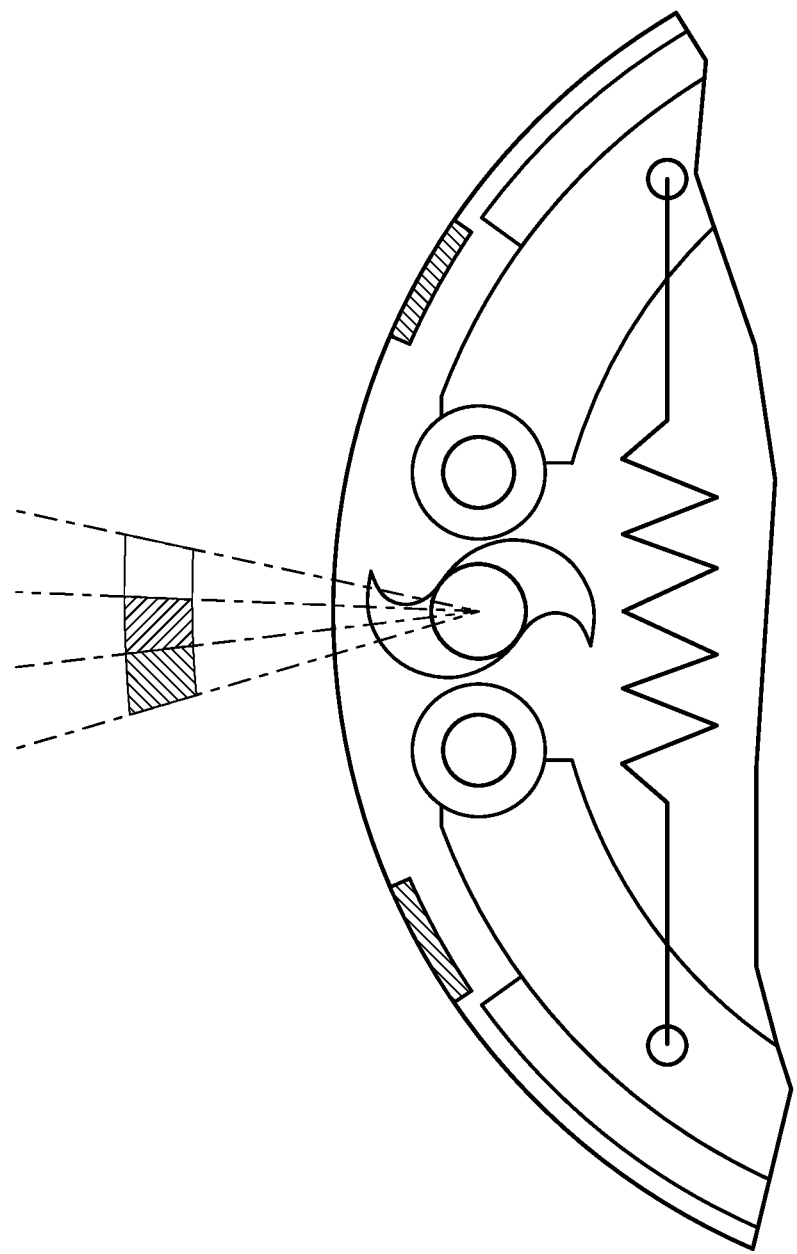
Figure 6:
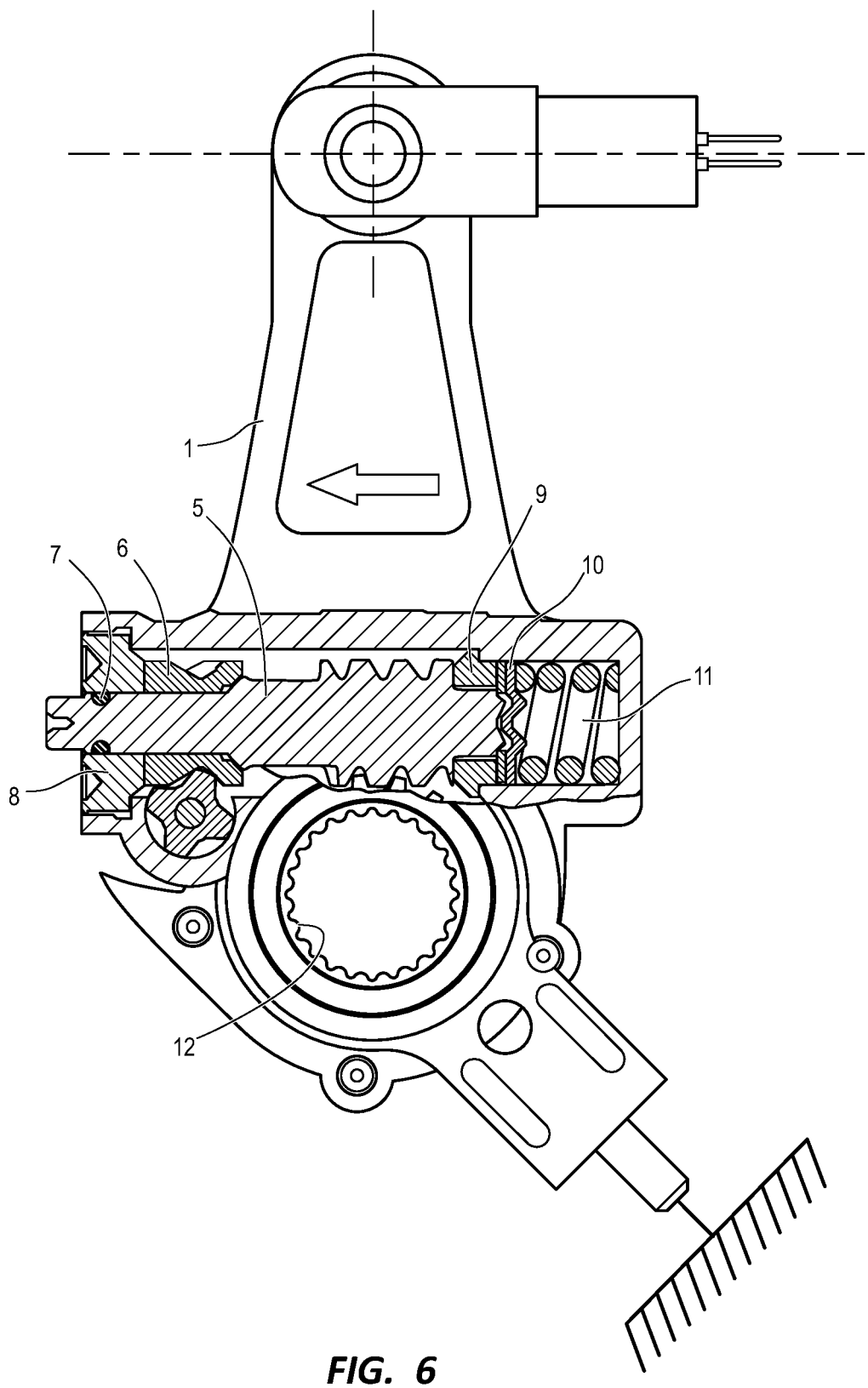
Figure 7:
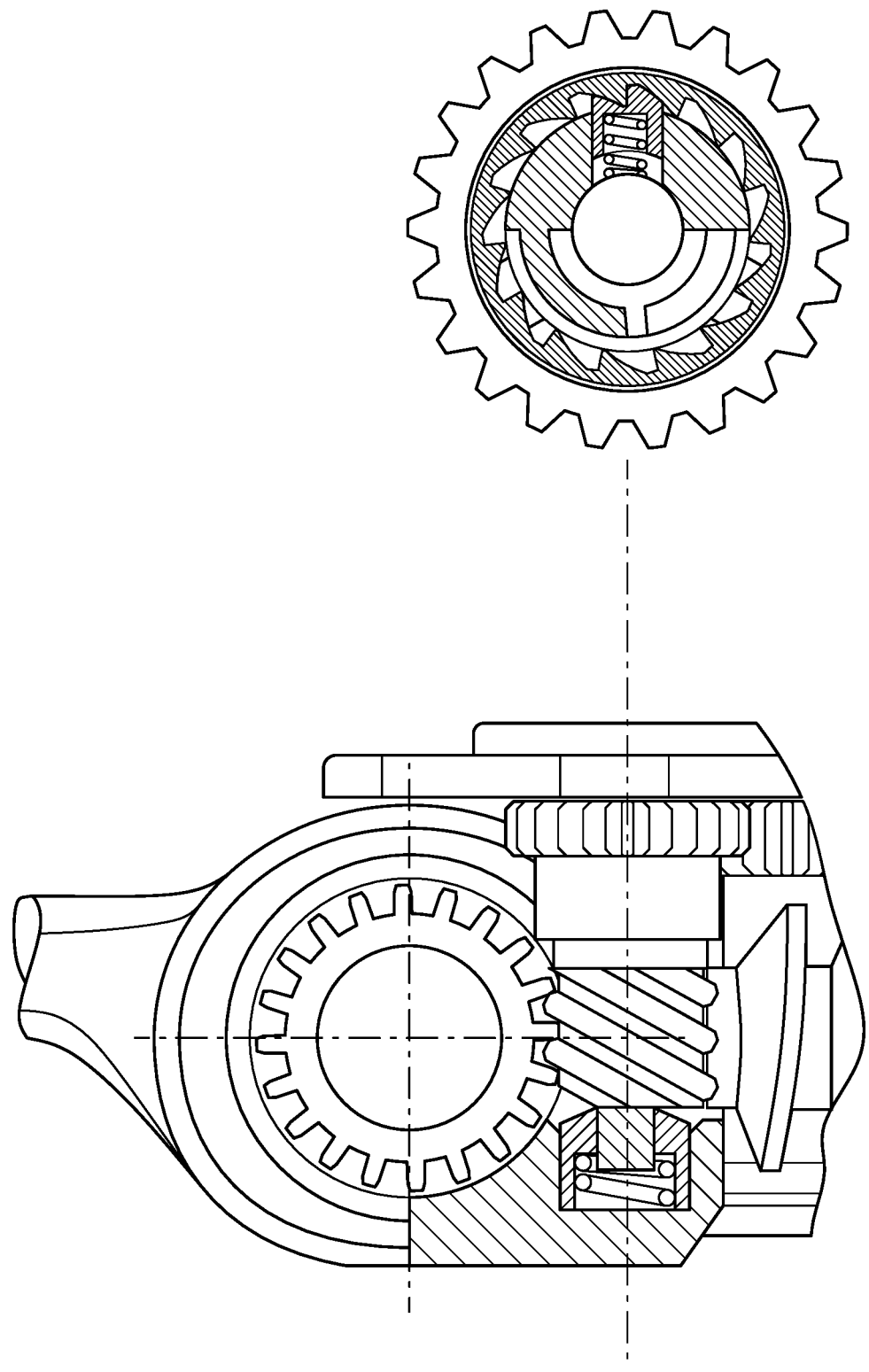
Figure 8:
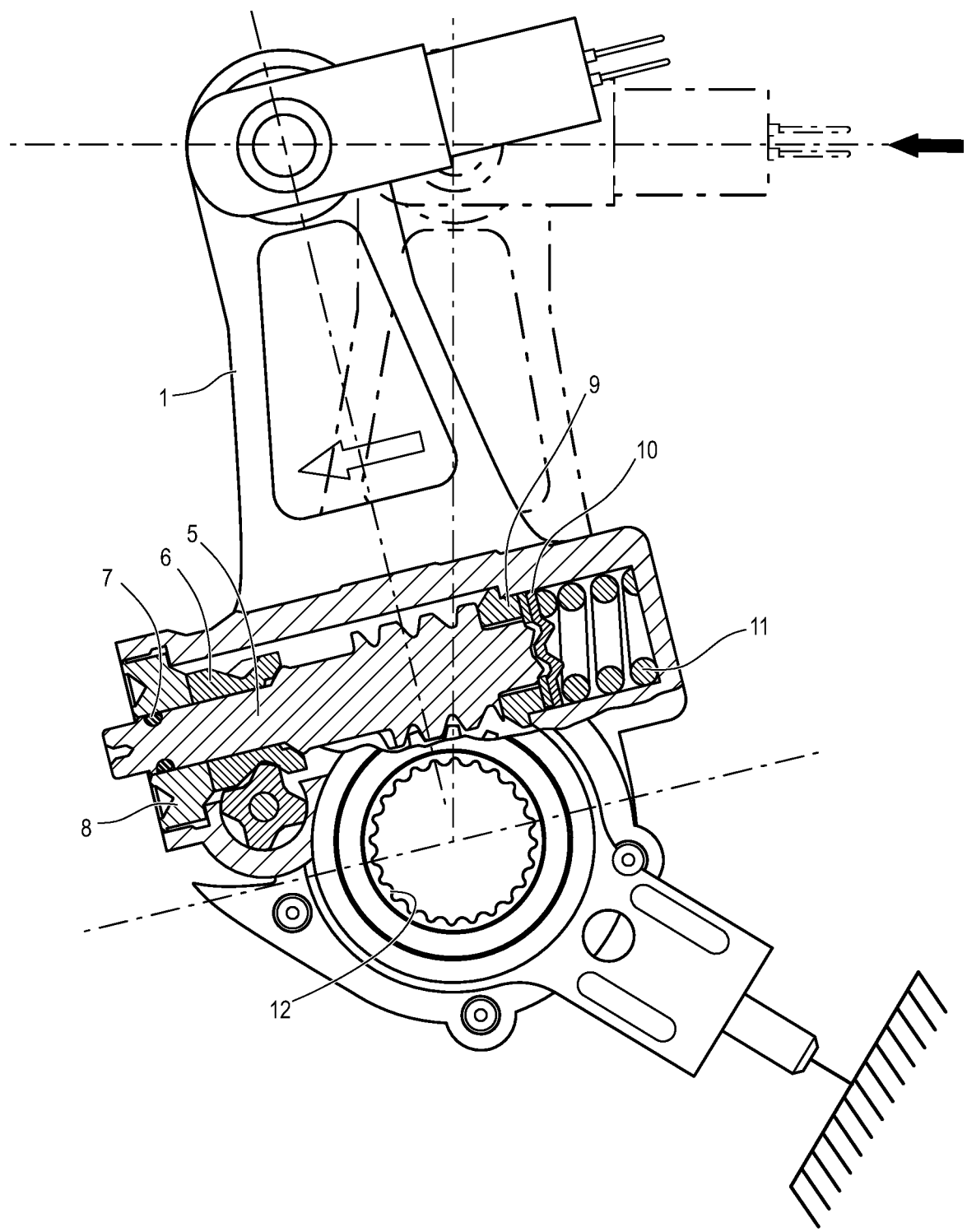
FIG. 8 is the illustration of rotation through clearance zone A
Figure 9:
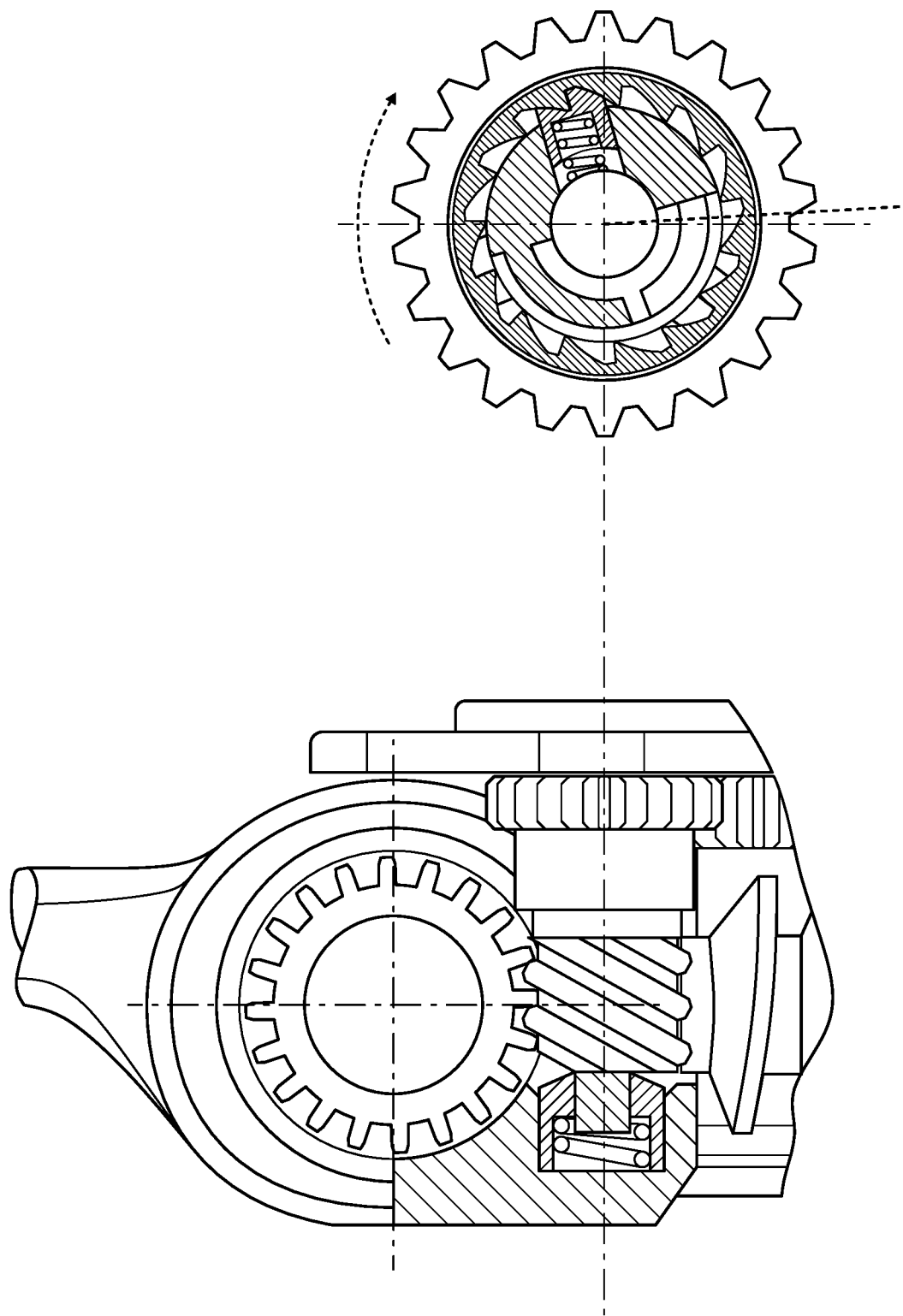
FIG. 9 is the illustration of Brakes application-thro' clearance zone

Description of FIG. 8 and FIG. 9

During the initial brake application, the pinion & ratchet (13.1) is rotated by the control arm assembly (17,19-22), due to the movement of the S-ASA body and the pawl housing (13.2) is also rotated along with pinion & ratchet (13.1) up to the preset gap between the stepped faces of control worm screw (13.5) and pawl housing (13.2) to ensure predetermined clearance stroke. Simultaneously the worm wheel (14) is rotated in the counter clockwise direction along with Automatic Slack Adjuster body (1); in turn the S camshaft engaged with the worm wheel spline (14') is rotated to lift the brake lining towards the brake drum.

Figure 10:
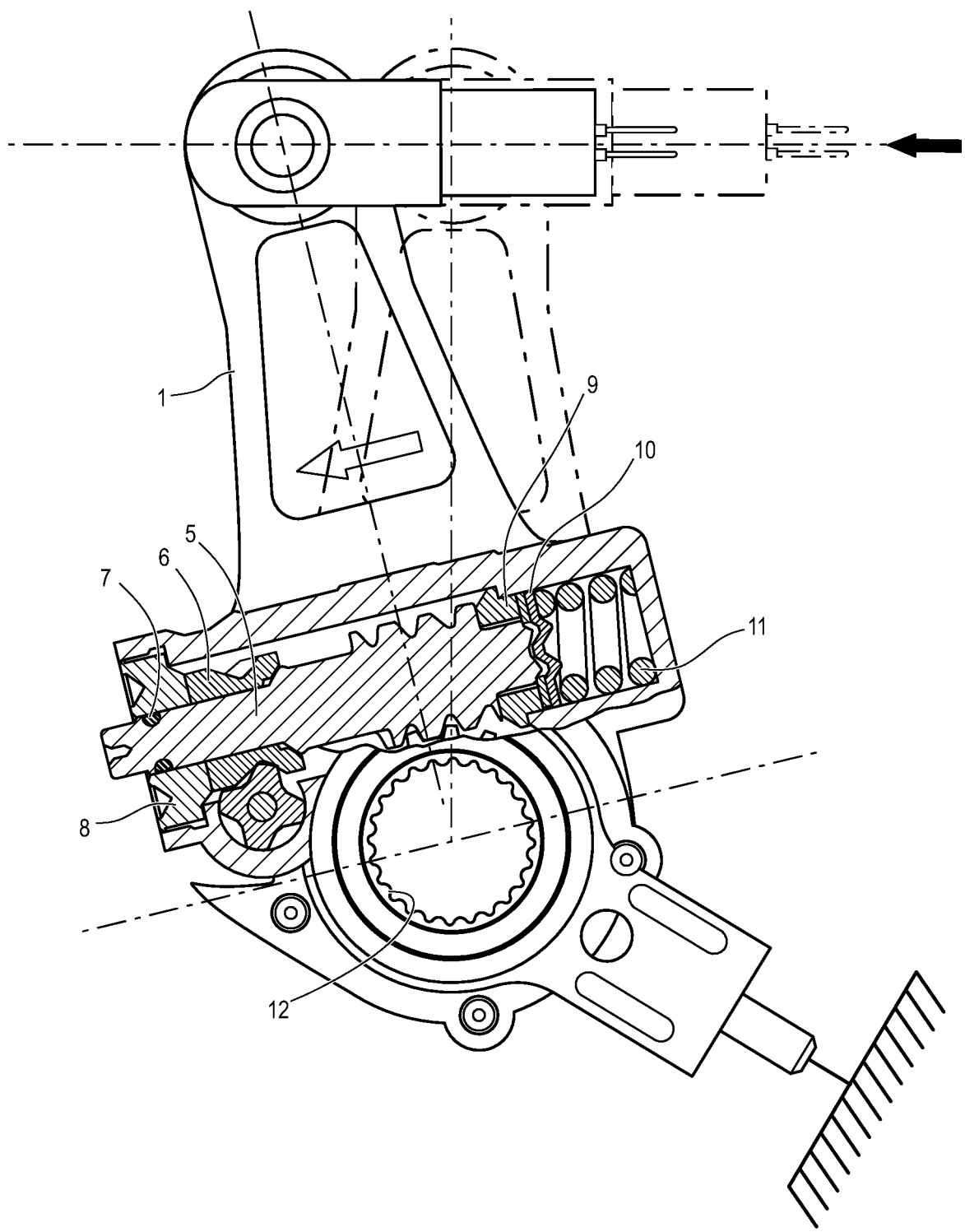
Figure 11:
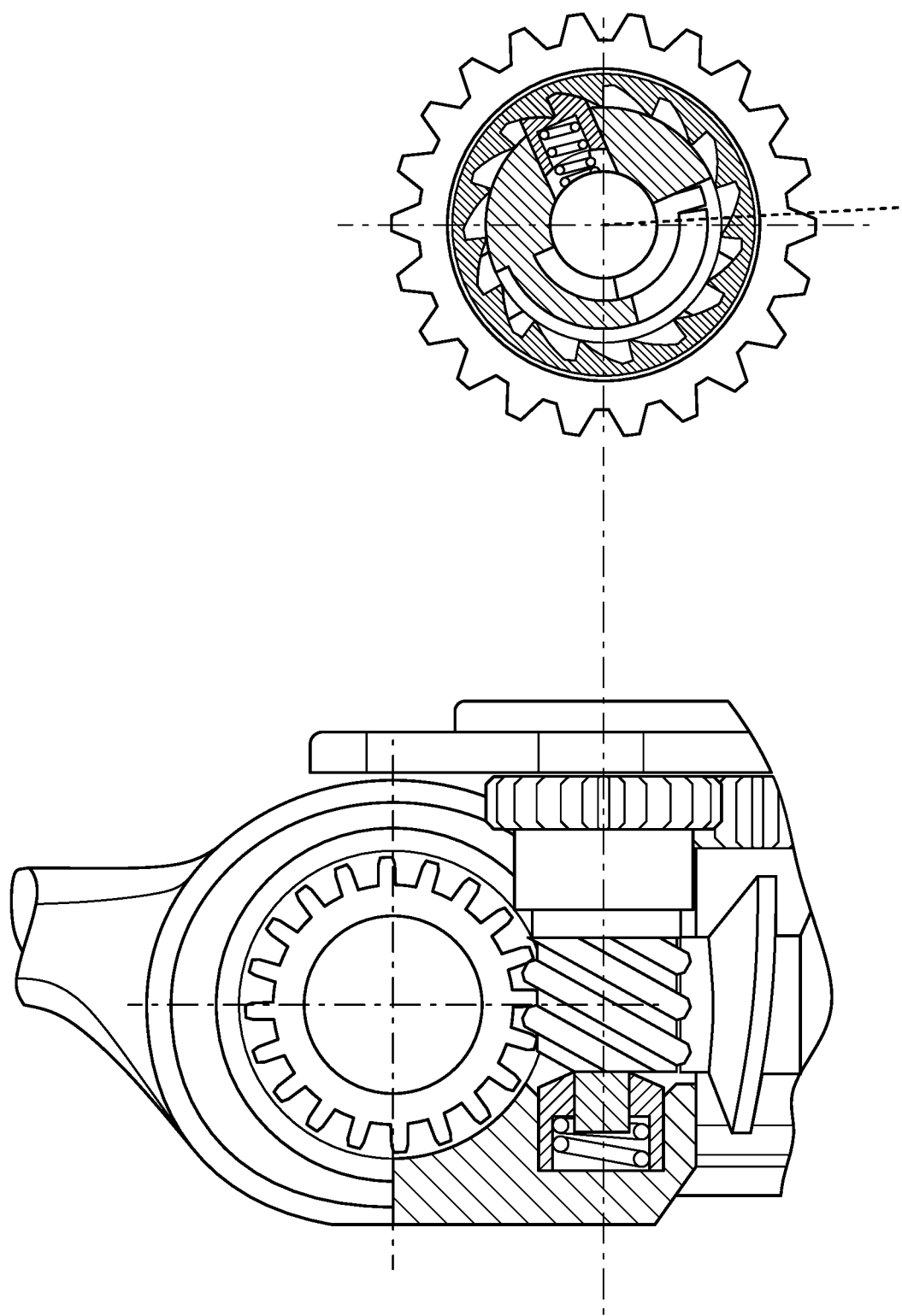

FIGS. 10 and 11 is the illustration of rotation through the excess clearance zone B Description of FIG. 10 and FIG. 11

When there is excess clearance due to wear in drum and lining, the lining does not touch the brake drum. During the further rotation (after passing through clearance stroke cycle) of the ratchet mechanism in the pinion & ratchet (13.1), overrides against pawl spring (13.4) load and gets a new engagement with the pawl (13.3) fixed to the pawl housing (13.2).

This is because control worm screw (13.5) is prevented from rotation by clutch worm wheel (6) due to excess friction on the clutch worm wheel (6) with its serration (6") fully engaged on the worm shaft serration (5').

Figure 12:
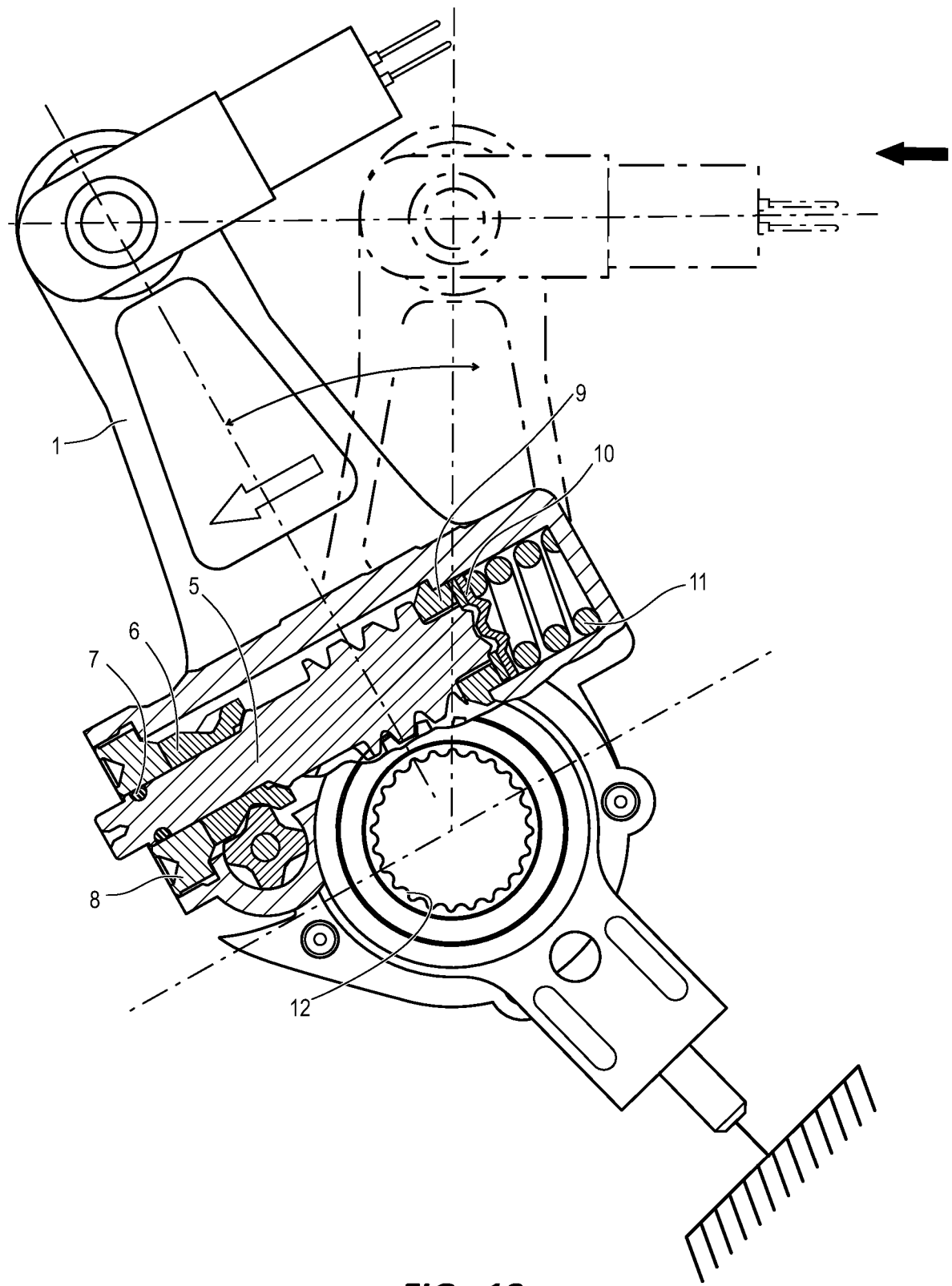
Figure 13:
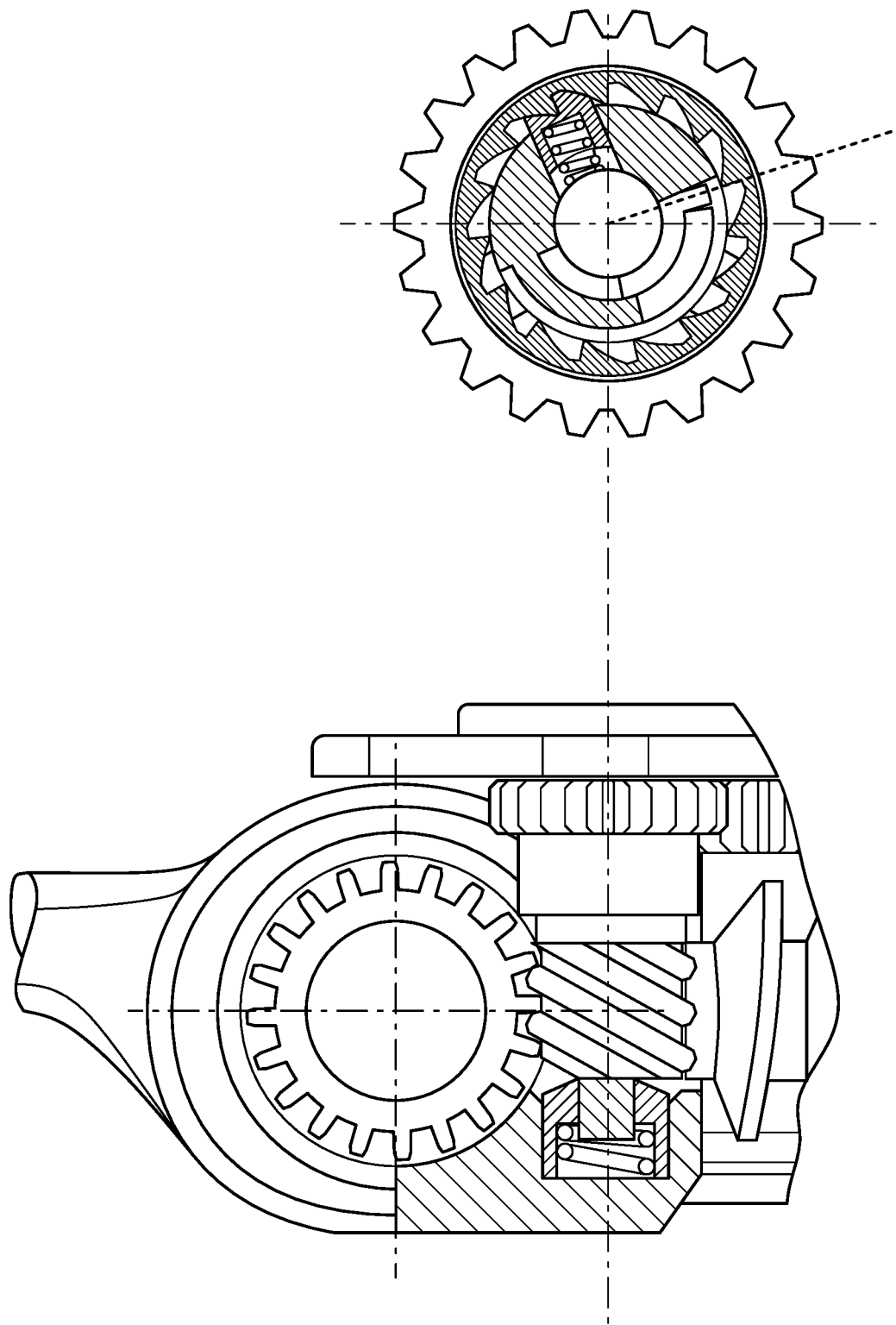

FIGS. 12 and 13 is the illustration of rotation into the elasticity angle C Description of FIG. 12 and FIG. 13

Once the brake lining engages the brake drum, the counter force increases and worm shaft (5) moves axially compressing the heavy compression spring (10). Clutch is disengaged as the serrated portion of worm shaft (5") is moved away from the clutch worm wheel serration (6").

Figure 14:
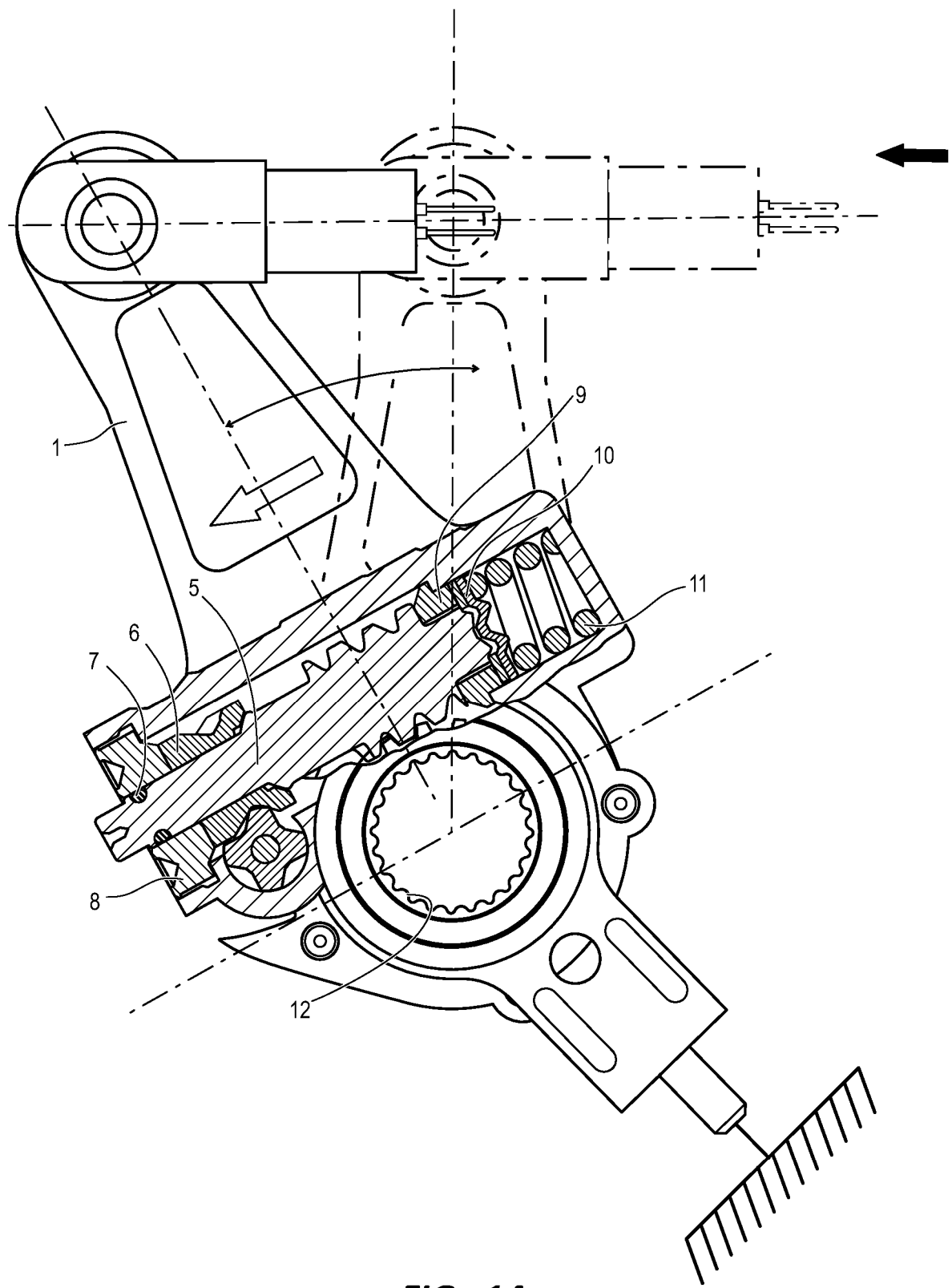
Figure 15:
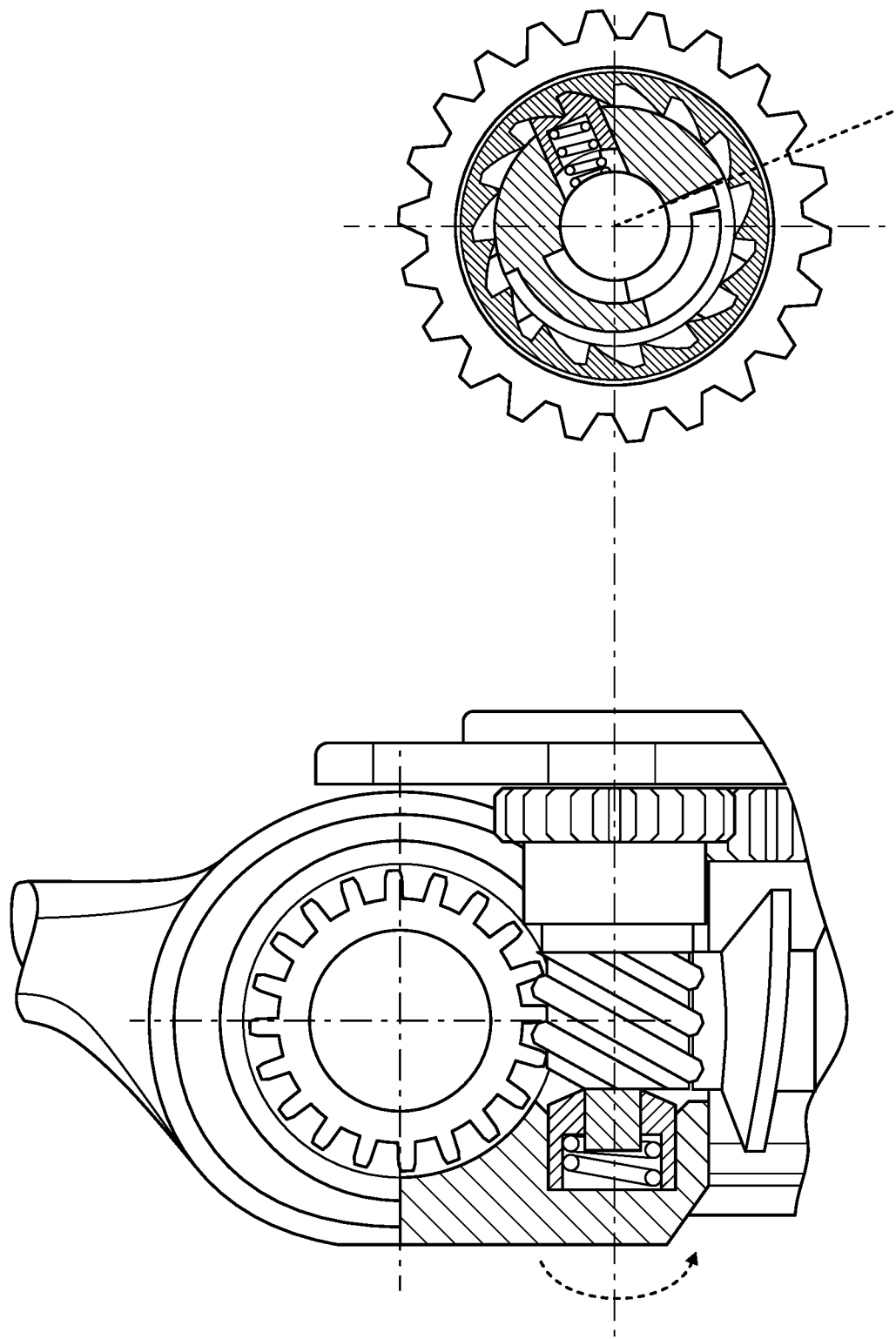

FIGS. 14 and 15 is the illustration of rotation through elasticity zone—C Description of FIG. 14 and FIG. 15

As the clutch is now disengaged, the resistance on the clutch worm wheel (6) is greatly reduced and permits the control worm screw (13.5) to rotate with the pinion and ratchet (13.1) as a whole unit retaining the relative positions. Thereby the lever movement during this period (expansion/deflection zone) is ignored. During this operation if there is any partial engagement between the pawl and ratchet, the Pawl Housing (13.2) will slightly slip back with the control worm screw (13.5) due to Pawl spring (13.4) load to engage in the previous ratchet.

Figure 16:
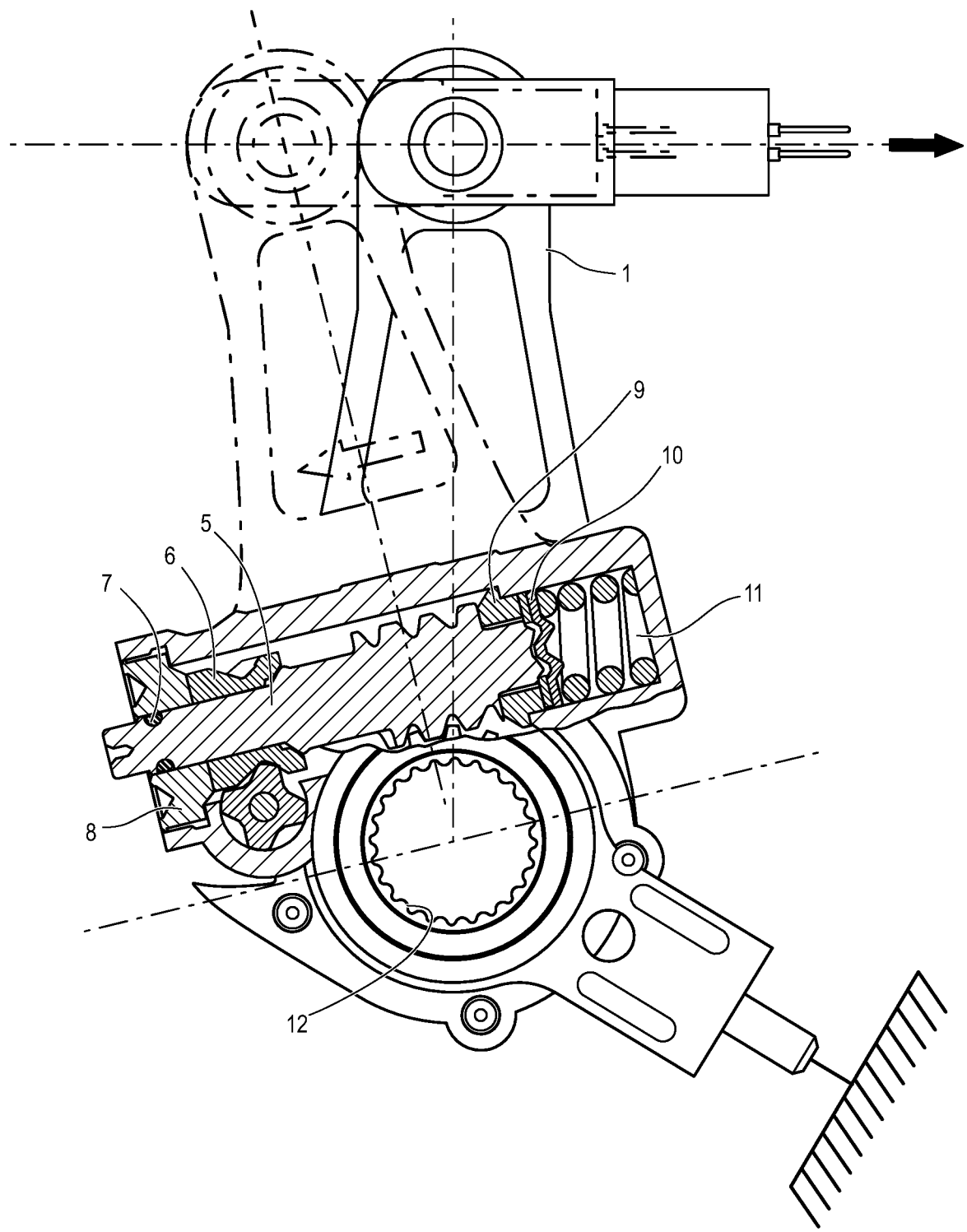
Figure 17:
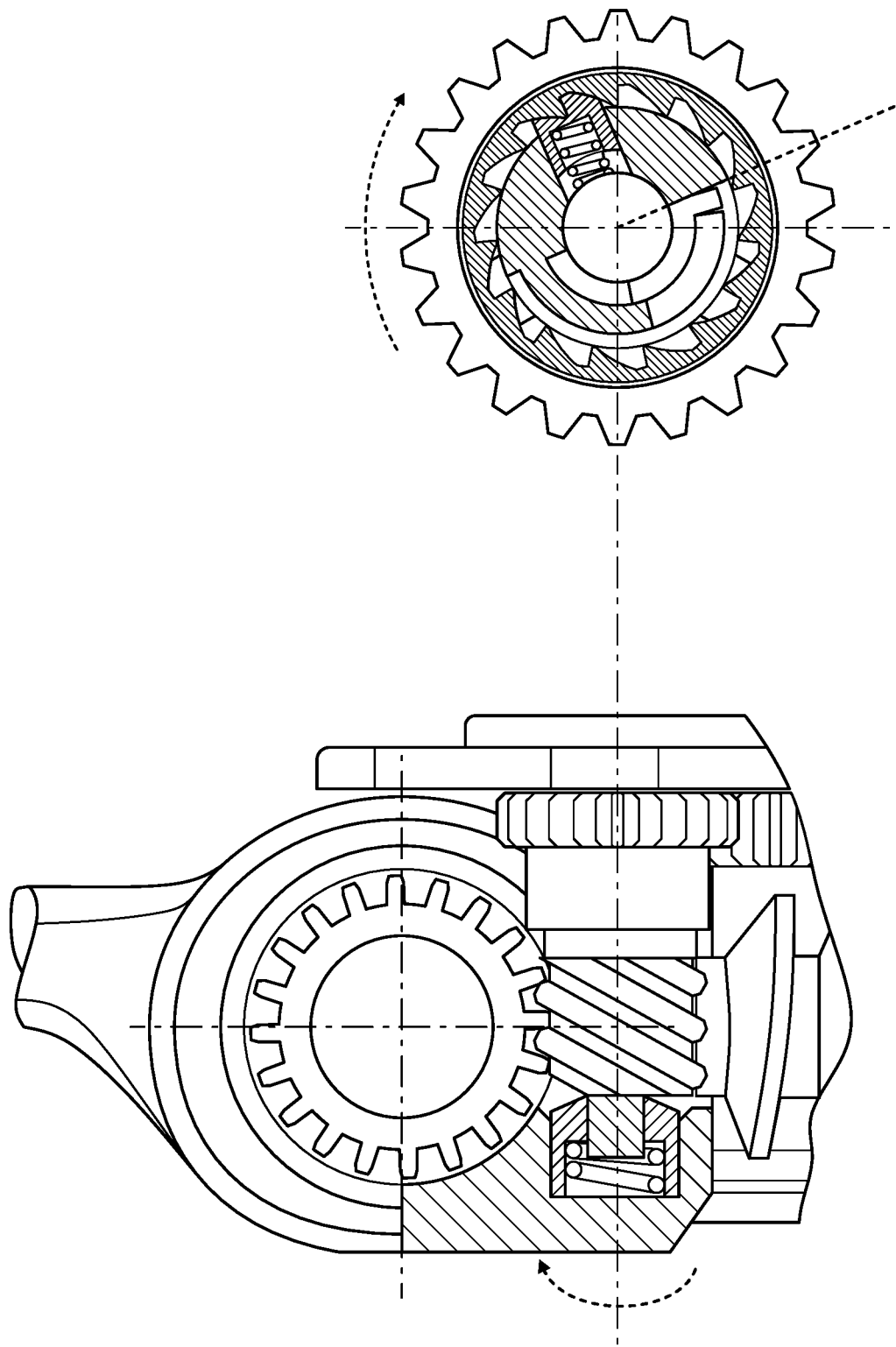

FIGS. 16 and 17 is the illustration of rotation back through elasticity zone C Description of FIG. 16 and FIG. 17

When the brake is released, the pinion and ratchet (13.1) is rotated in clockwise direction by the control gear wheel (19), opposite to the direction of brake application and the control worm screw (13.5) follows the rotation of pinion and ratchet (13.1) as a whole unit along with clutch worm wheel (6) covering the deflection stroke of the Automatic Slack Adjuster. However, the worm shaft (5) remains static as the clutch is disengaged between serrations (5') and (6").

Figure 18:
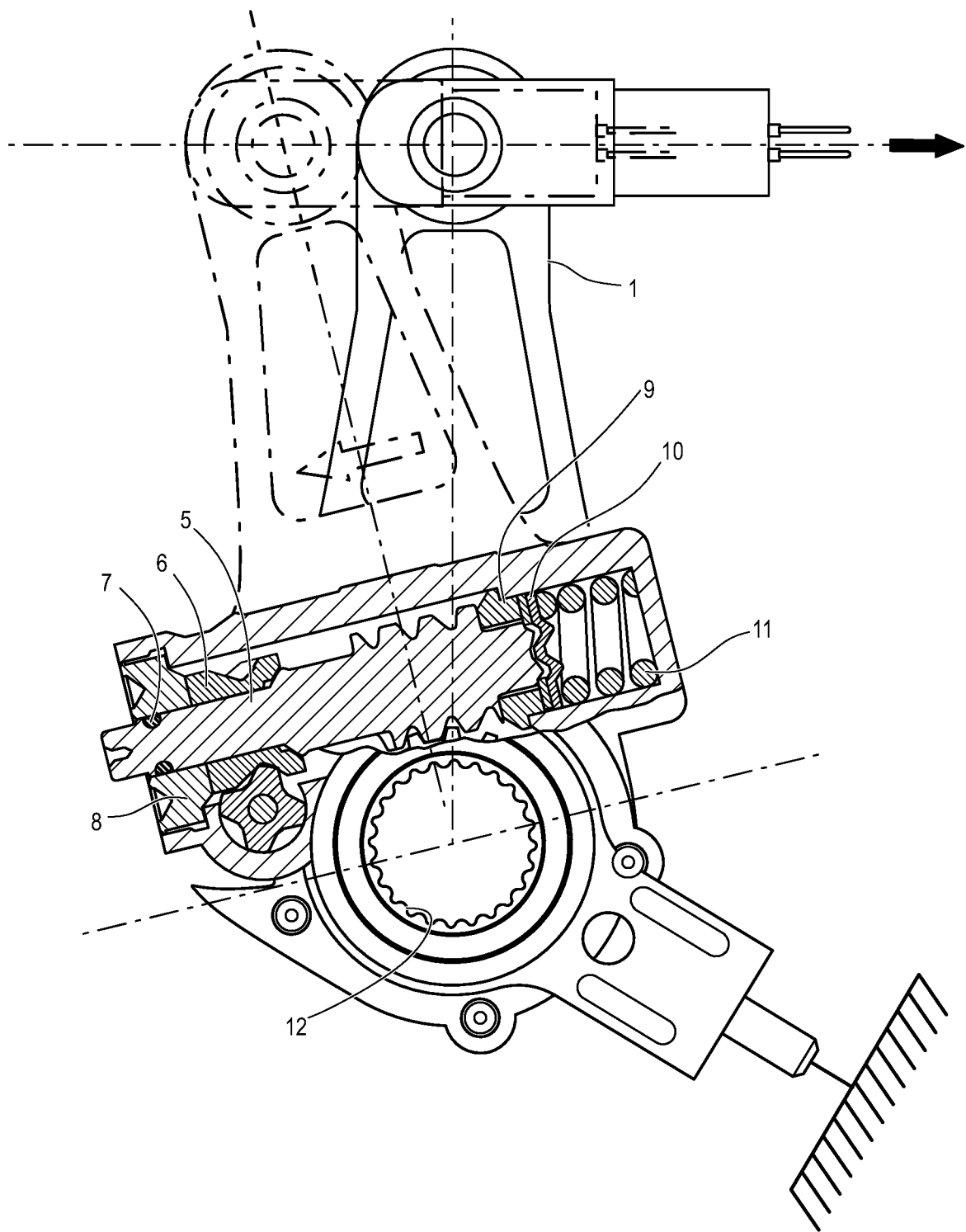
Figure 19:
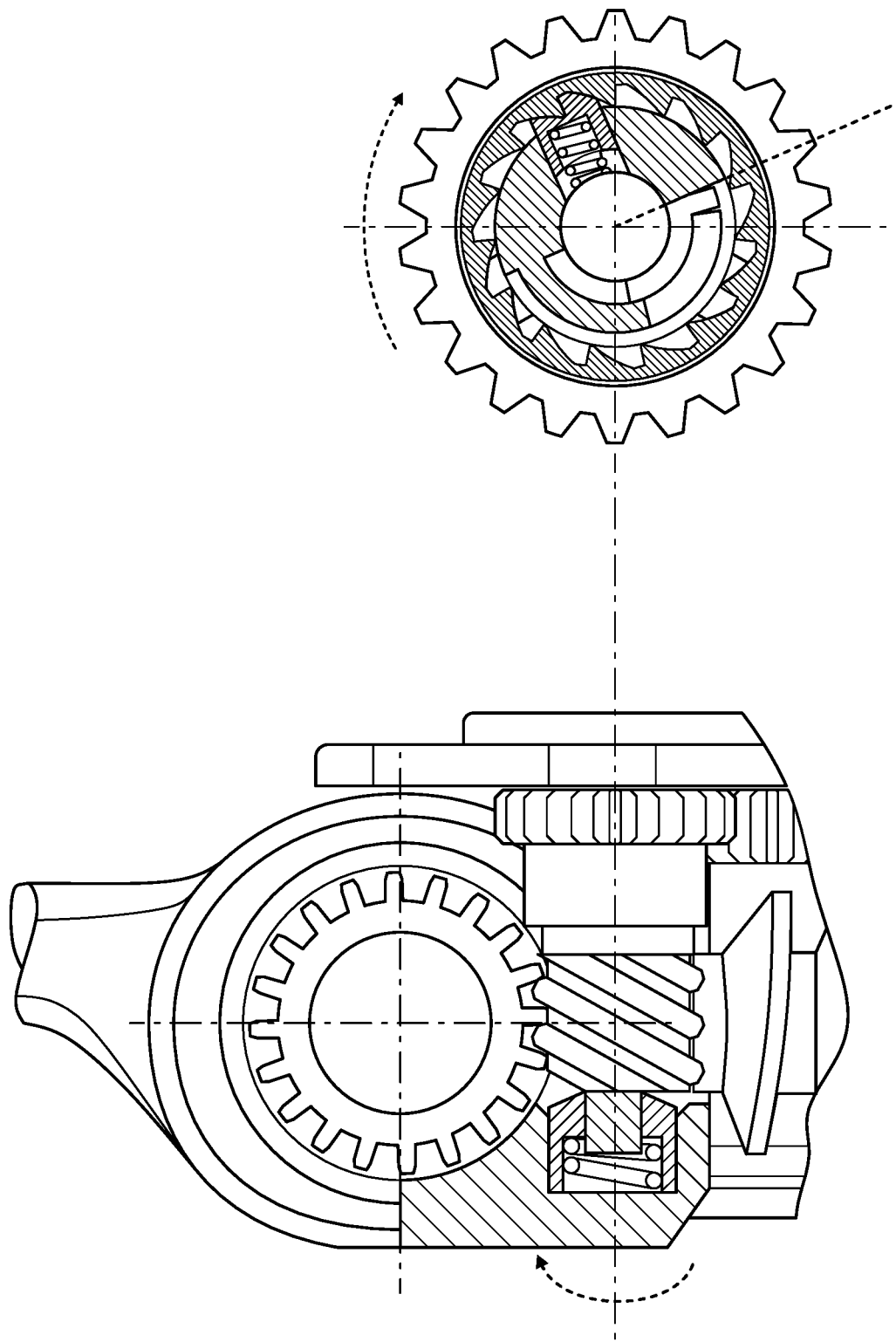

FIGS. 18 and 19 is the illustration of rotation back into the clearance zone A Description of FIG. 18 and FIG. 19

Once the brake lining moves away from the brake drum, the force is reduced and the load of the heavy compression spring (10) moves the worm shaft (5) to engage the clutch preventing the free rotation of clutch worm wheel (6).

Figure 20:
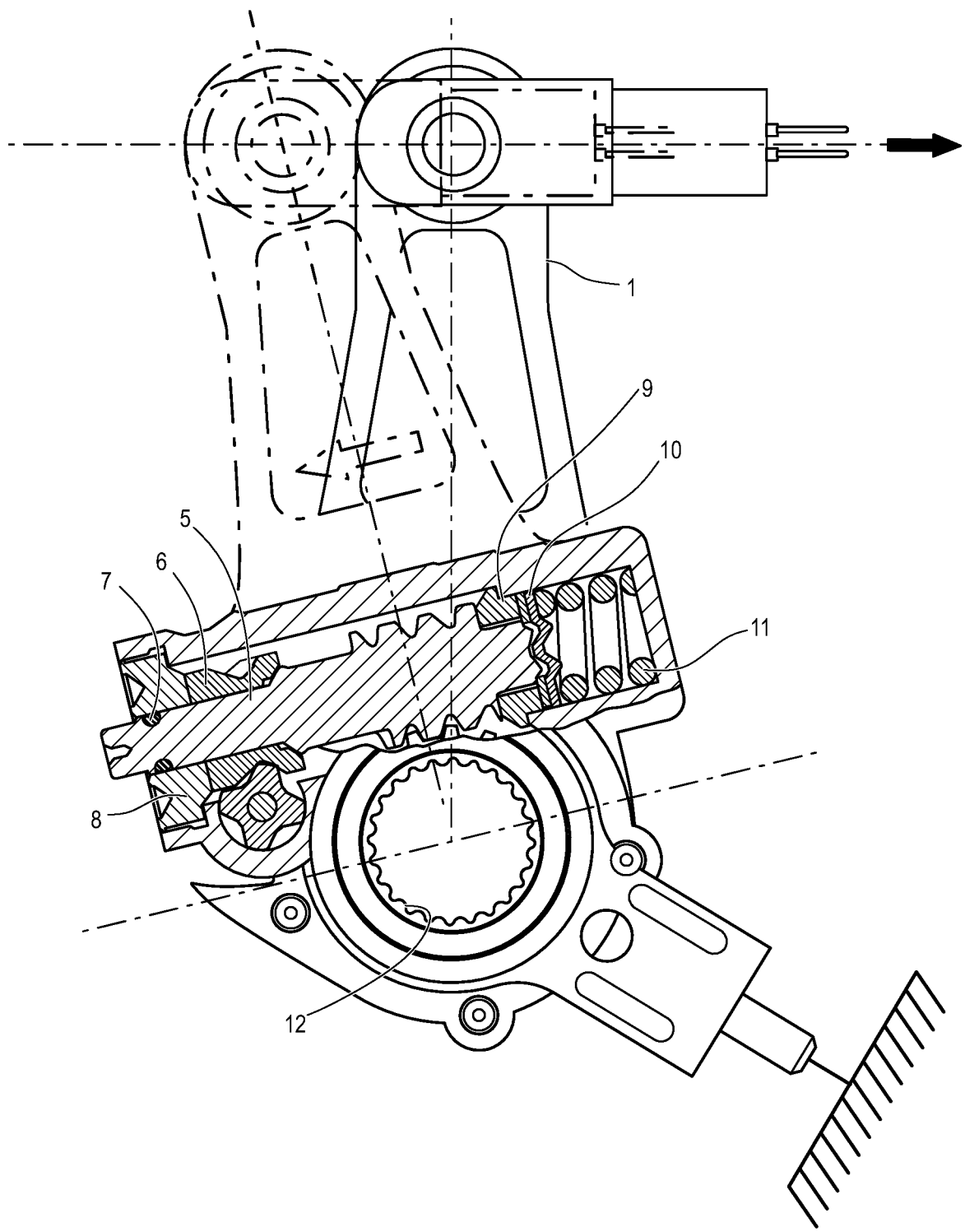
Figure 21:
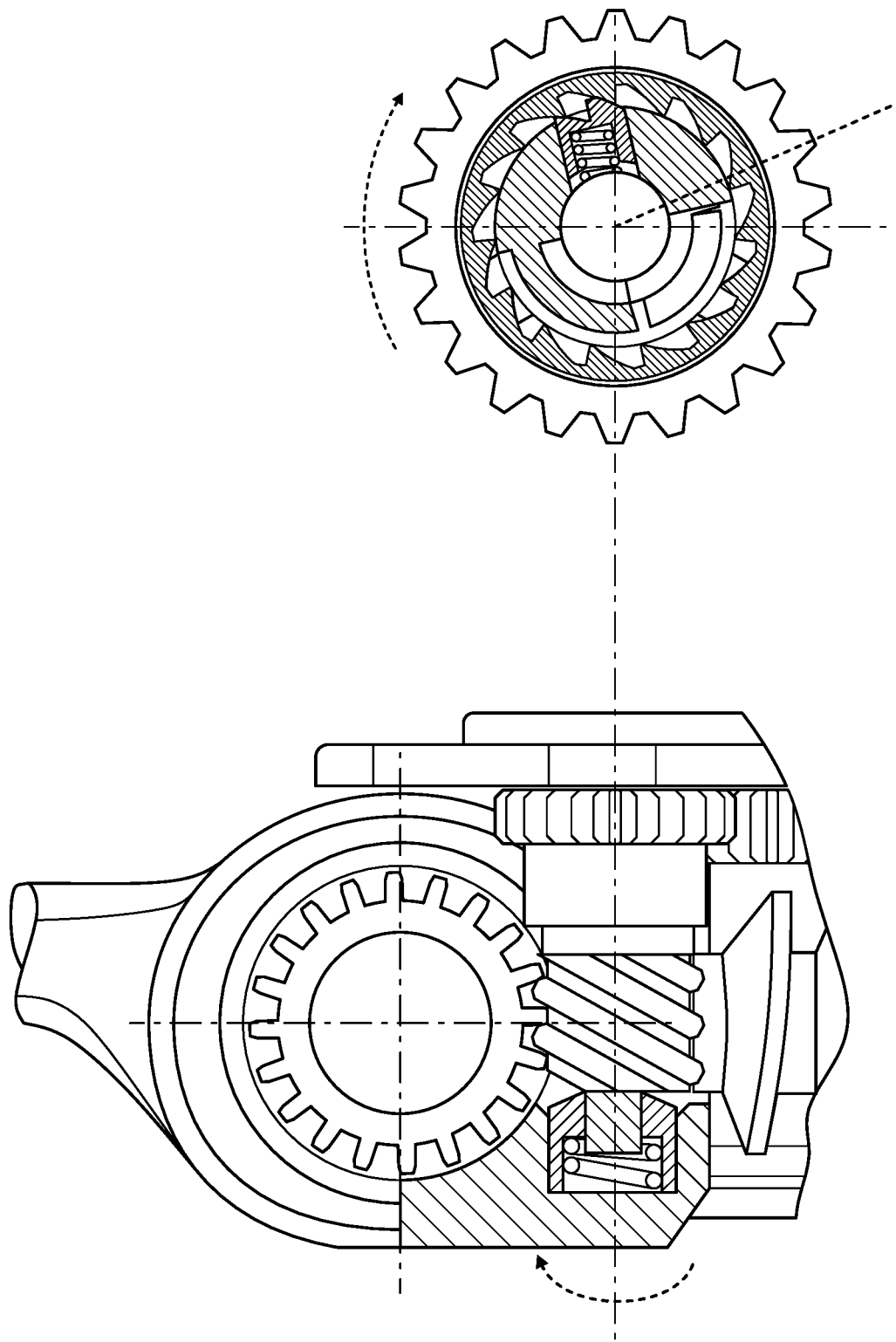

FIGS. 20 and 21 is the illustration of rotation back through the clear zone A Description of FIG. 20 and FIG. 21

During the further release movement of brake actuator, the body (8) keeps rotating in clock-wise direction, the control gear wheel (19) continues to rotate the pinion & ratchet (13.1), but due to the friction on the clutch worm wheel (6) which is in clutch engaged condition, the control worm screw (13.5) is retained in same position and pawl housing (13.2) alone is rotated with the pinion & ratchet (13.1) until the closed gap between control worm screw (13.5) and pawl housing (13.2) is restored against the torsion spring (13.9). This movement covers the clearance stroke of the Automatic Slack Adjuster, which was achieved during the initial period of brake application.

Figure 22:
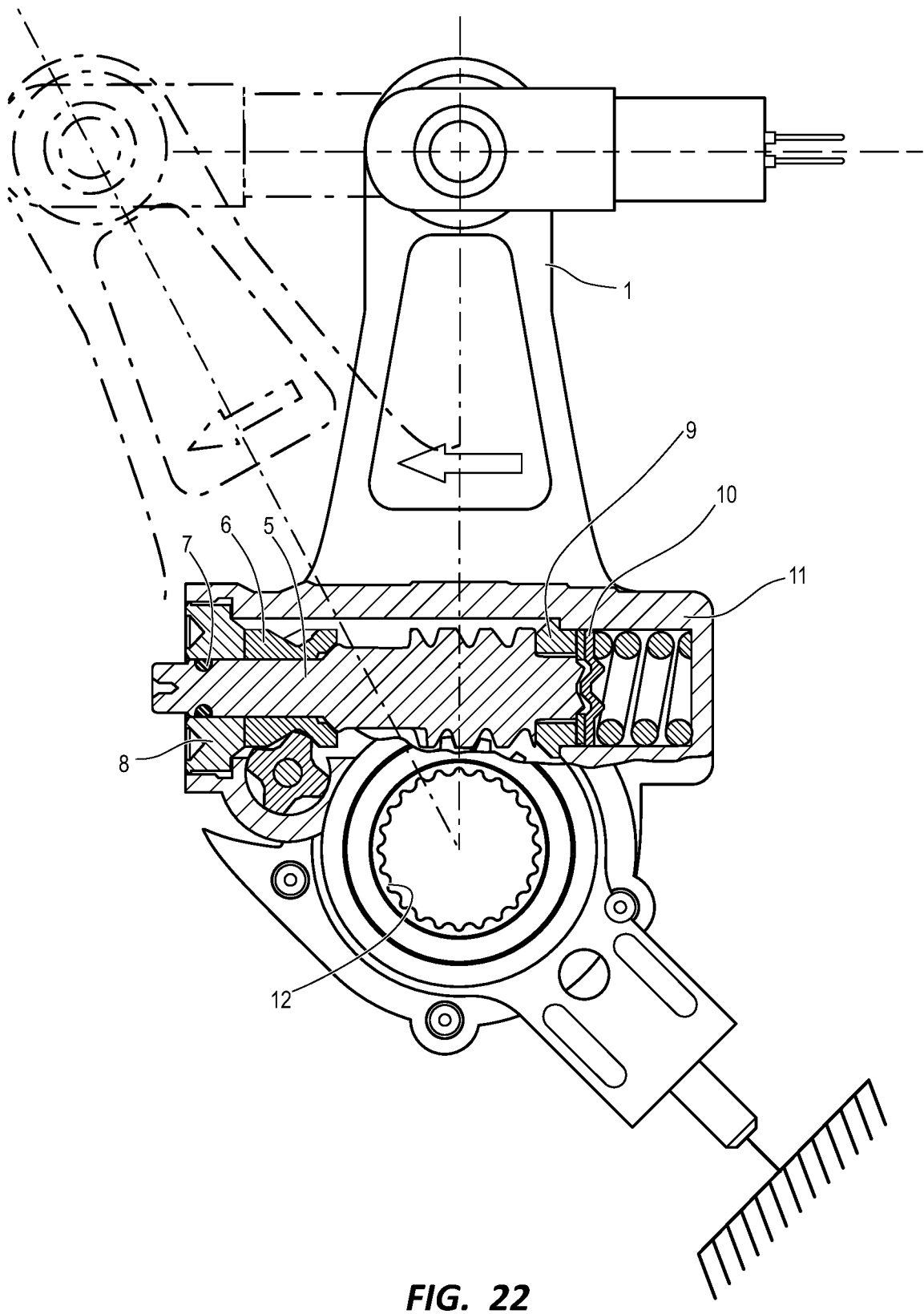
Figure 23:
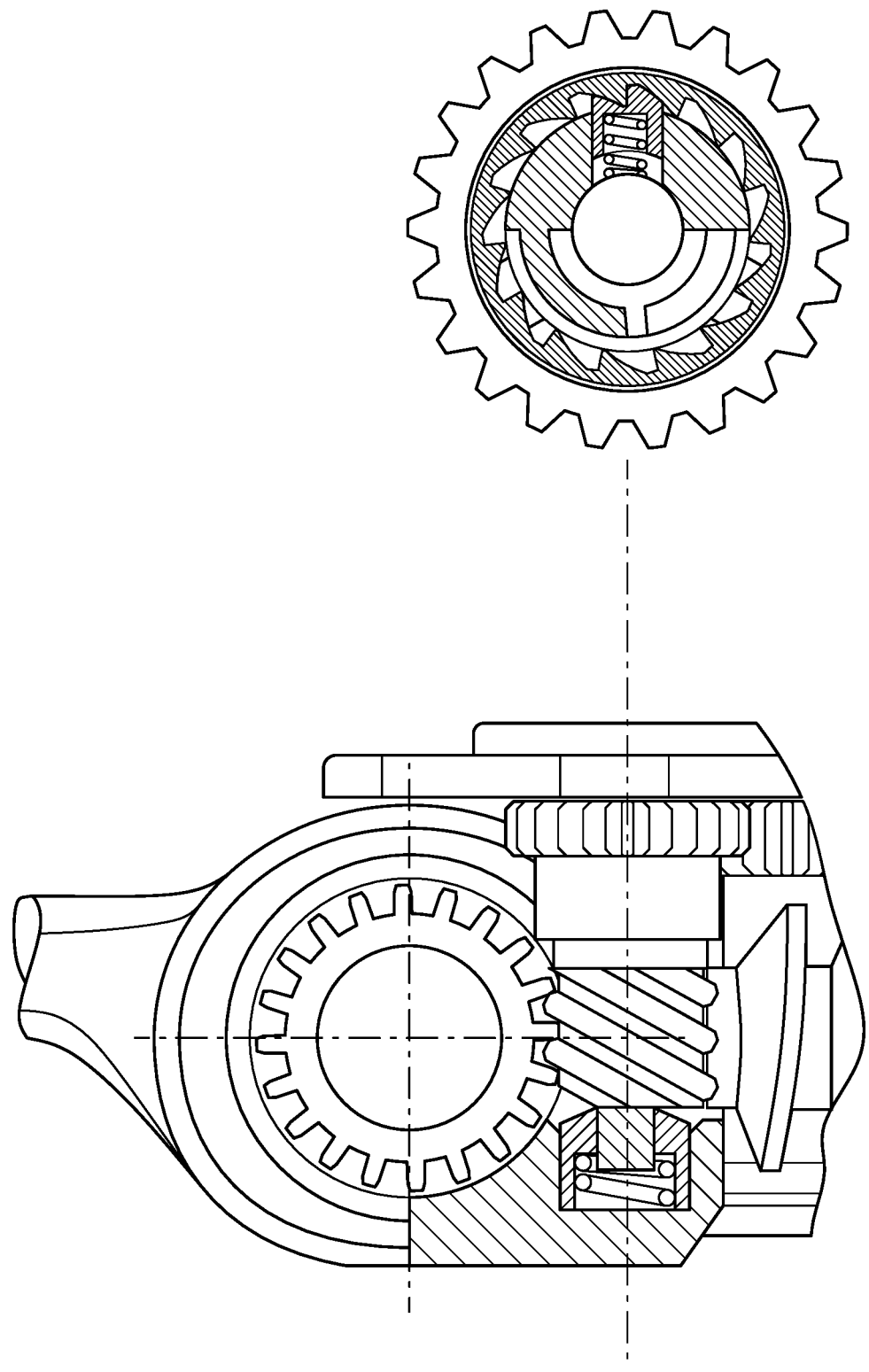

FIGS. 22 and 23 is the illustration of eliminating the slack with rotation back through the excess clearance zone A Description of FIG. 22 and FIG. 23

During the final releasing rotation of Automatic Slack Adjuster, the pinion & ratchet (13.1) rotated by the control gear wheel (19) in turn rotates the control worm screw (13.5) [by the one-way lock mechanism between ratchet (13.1') and pawl pin (13.3)] and the clutch worm wheel (6). The worm shaft (5) that is now engaged with clutch worm wheel (6) is rotated and in turn rotates the worm wheel (14) and 'S' camshaft to effect the adjustment of lining clearance. This is in proportion to the new engagement taken place during the brake application stroke explained earlier.

In one aspect the invention discloses an automatic slack adjuster for an automobile with a housing having an aperture for receiving a brake cam shaft comprising of a worm gear coaxially mounted within the said housing aperture and configured to coaxially engage the brake cam shaft, such that the said worm gear and said cam shaft rotating together about a first axis. The arrangement has a bore with a single open end for receiving a worm clutch shaft. The said worm clutch shaft is mounted in the said housing to rotate about a second axis, which is perpendicular to the first axis. The said worm shaft has a first and second sides terminating at first and second ends, and defining a clutch worm gear intermediate wheel engaged with said worm gear. The first end is remote from the housing terminating with a bearing retainer and the first side having a worm shaft ring sandwiched between the clutch worm gear and the bearing retainer. The second end is terminating with a spring and the second side having a spring seat for the said spring and a thrust bush sandwiched between the spring and the worm clutch shaft.

In another aspect the invention discloses a method of assembling an automatic slack adjuster having a housing, the said housing having an aperture for receiving a cam shaft comprising providing a worm gear coaxially mounted within the aperture and configured to coaxially engage the brake cam shaft, such that the worm gear and said cam shaft rotate together about a first axis. The above slack adjuster as described is unknown in prior art. The method also includes providing a bore in the housing with a single open end. The method involves mounting a worm clutch shaft in the said housing and adapting it to rotate about a second axis, which is perpendicular to the first axis. The method involves defining a clutch worm gear intermediate wheel on the worm clutch shaft and arranging a bearing retainer on a first end of the clutch shaft sandwiching a worm shaft ring between the said clutch worm gear and the bearing retainer, arranging a spring with a seat on the second end of the worm clutch shaft, and sandwiching a thrust bush between the said clutch worm gear and the spring. The method of arranging as disclosed above is novel and unknown in prior art.

As described above and with reference to the annexed figures the invention discloses in one aspect an automatic slack adjuster for an automobile. This slack adjuster has a housing with a single aperture for receiving a brake cam shaft. The arrangement includes a worm gear (3) coaxially mounted within the said housing aperture and configured to coaxially engage the brake cam shaft, such that the said worm gear (3) and said cam shaft rotating together about a first axis. The bore has a single open end for receiving a worm shaft (5). The said worm shaft (5) is mounted in the said housing so as to rotate about a second axis, which second axis shall be perpendicular to the first axis. The said worm shaft (5) shall have a first and a second sides terminating at first and second ends. It defines a clutch worm wheel (6) engaged with a control worm screw (13.5). The first end remote from the housing, terminates with a bearing retainer (8). The first side has a worm shaft ring (7) sandwiched between the clutch worm gear (3) and the bearing retainer (8). The second end terminating with a spring (11). The second side having a spring seat (10) for the said spring. A thrust bush (9) is sandwiched between the spring (11) and the worm shaft (5).

In another aspect the invention discloses a method of arranging the components and assembling an automatic slack adjuster. Which automatic slack adjuster having a housing with the said housing having an aperture for receiving a cam shaft. This method involves providing a worm gear (3) coaxially mounted within the aperture and configured to coaxially engage the brake cam shaft, such that the worm gear (3) and said cam shaft rotate together about a first axis. It also comprises of providing a bore in the housing with a single open end, which is the most distinctive arrangement unknown in the prior art. The method comprises of mounting a worm shaft (5) in the said housing and adapting it to rotate about a second axis, which is perpendicular to the first axis. The arrangement also includes defining a clutch worm gear intermediate wheel (6) on the worm shaft (5) and arranging a bearing retainer (8) on a first end of the worm shaft (5). It also includes placing a sealing ring on the groove of the worm shaft (5) and providing sealing between worm shaft (5) and the bearing retainer (8). It further includes arranging a spring (11) with a seat (10) on the second end of the worm clutch shaft (5). The method involves further sandwiching a thrust bush (9) between the said worm shaft (5) and the spring (11).

The description embodiments and illustration are given and used only for easy understanding. All variations and modifications as obvious and known to skilled persons are well within the scope of the invention

The invention claimed is:

1. An automatic slack adjuster for an automobile with a housing having an aperture for receiving a brake cam shaft comprising:
   a. a worm gear coaxially and internally mounted within the housing aperture and configured to coaxially engage the brake cam shaft, such that the worm gear and the brake cam shaft rotate together about a first axis,
   b. a bore with a single open end for receiving a worm shaft having a worm shaft serration, and
   c. the worm shaft mounted in the housing to rotate about a second axis, which is perpendicular to the first axis, the worm shaft having first and second sides terminating at first and second ends, and defining a clutch worm gear intermediate wheel engaged with a control worm screw, the first end remote from the housing, terminating with a bearing retainer, the first side having a worm shaft ring sandwiched between the clutch worm gear and the bearing retainer, the second end terminating with a spring, the second side having a spring seat for the spring and a thrust bush sandwiched between the spring and the worm shaft, wherein the thrust bush is configured to internally actuate a cam ring to transfer a thrust load from the worm shaft to the housing, the worm shaft configured to move axially away from the clutch worm gear intermediate wheel when the brake cam shaft is further compressed after brake drum contact causing the worm shaft to cease rotation.

2. A method of assembling an automatic slack adjuster having a housing, the housing having an aperture for receiving a cam shaft comprising:
   a. providing a worm gear coaxially and internally mounted within the aperture and configured to coaxially engage the brake cam shaft and internally actuate a cam ring, such that the worm gear and the cam shaft rotate together about a first axis;
   b. providing a bore in the housing with a single open end,
   c. mounting a worm shaft having a worm shaft serration in the housing and adapted to rotate about a second axis, which is perpendicular to the first axis,
   d. defining a clutch worm gear intermediate wheel on the worm shaft,
   e. arranging a bearing retainer on a first end of the worm shaft,
   f. placing a sealing ring on the groove of the worm shaft and providing sealing between worm shaft and the bearing retainer,
   g. arranging a spring with a seat on the second end of the worm shaft, and
   h. sandwiching a thrust bush between the worm shaft and the spring, wherein the thrust bush is configured to transfer a thrust load from the worm shaft to the housing.

* * * * *